INVENTOR.
OSCAR A. BARDY
BY Polachek & Saulsbury
ATTORNEYS

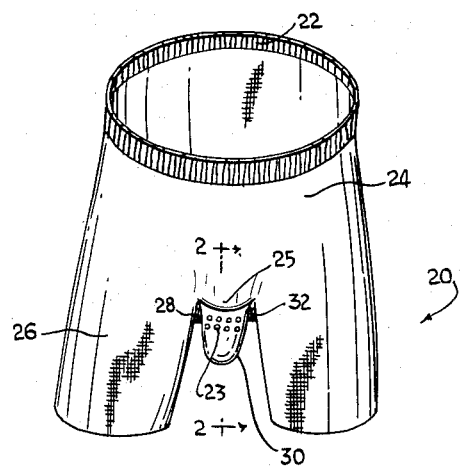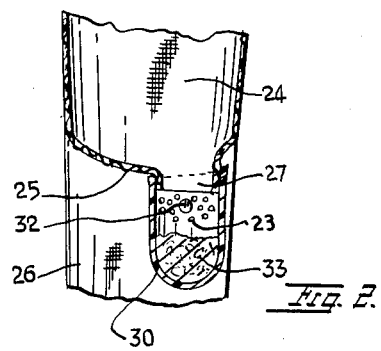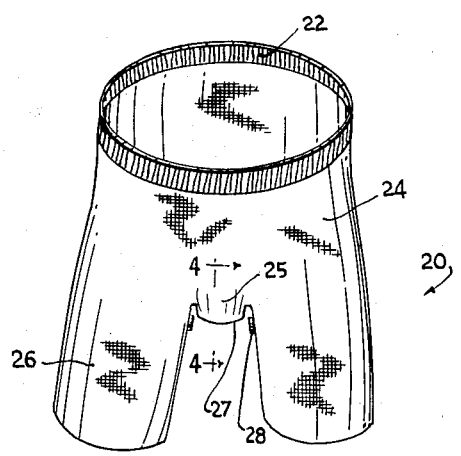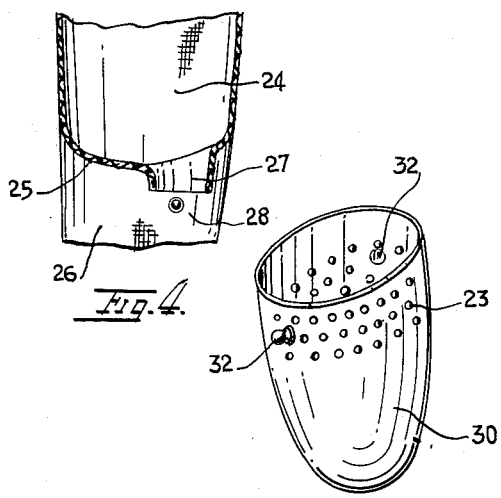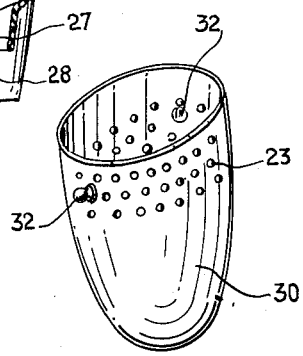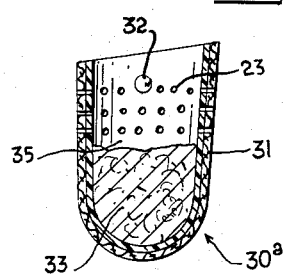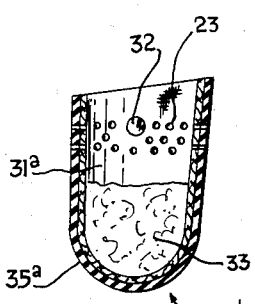
INVENTOR.
OSCAR A. BARDY Oct. 19, 1965  O. A. BARDY  3,212,500
HYGENIC RECEPTACLE FOR UNDERGARMENTS
Filed April 24, 1963  2 Sheets-Sheet 2

United States Patent Office 3,212,500
Patented Oct. 19, 1965

3,212,500
HYGIENIC RECEPTACLE FOR UNDERGARMENTS
Oscar A. Bardy, 150 E. 18th St., Brooklyn 26, N.Y.
Filed Apr. 24, 1963, Ser. No. 275,277
2 Claims. (Cl. 128—295)

This invention concerns an improvement in undergarments for men and boys.

According to the invention there is provided an undergarment such as undershorts with a cut-out crotch, and an attached or detachable crotch piece. The crotch piece is in the form of a bag or pocket and may contain a removable pad of moisture absorbent fibrous material. The crotch piece may be made in one or a plurality of layers. At least one layer will be made of moistureproof material. Either an inner or outer layer or both inner and outer layers may be made of woven cloth material, with an intermediate moistureproof rubber or plastic layer. Ventilation openings are provided in the crotch piece. The crotch piece insures that urine drippings are caught in the absorbent pad for convenient disposition. The crotch piece can easily be removed for laundering, or can be laundered while attached to the undergarment.

It is therefore one object of the invention to provide a sanitary accessory for an undergarment in the form of a crotch bag or pocket containing a removable fibrous pad, and means for partially or wholly detaching the bag from the undergarment.

Another object is to provide undershorts for a male person in which there is a cut-out crotch with an attached crotch bag having a moistureproof wall and a disposable fibrous pad in the closed bottom of the bag.

Another object is to provide a crotch bag as described with a front slit covered by a flap and permitting lateral access to the interior of the bag.

A further object is to provide a crotch bag as described with a plurality of snap fasteners permitting adjustable shortening and lengthening of the bag, with mating fasteners at the cut-out crotch of the undergarment for removably supporting the crotch bag.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an oblique front view of an undergarment and attached crotch bag according to the invention.

FIG. 2 is a sectional view on an enlarged scale taken on line 2—2 of FIG. 1.

FIG. 3 is an oblique front view similar to FIG. 1 with crotch bag removed.

FIG. 4 is a sectional view on an enlarged scale taken on line 4—4 of FIG. 3.

FIG. 5 is a perspective view on an enlarged scale of a crotch bag.

FIG. 6 and FIG. 7 are sectional views similar to a part of FIG. 2, showing other crotch bag constructions.

Figure 8:
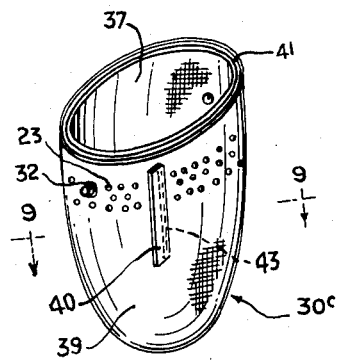
FIG. 8 is a perspective view of another crotch bag.

Referring to the drawings, there is shown in FIGS. 1–4 an undergarment in the form of undershorts 20 with an elastic waistband 22, trunk 24 and short legs 26. Between the legs is a crotch 25 which has an open bottom. The crotch is preferably formed with a short tubular depending extension 27; see FIGS. 2 and 4. Two snap fastener members 28 are provided at upper inner ends of the legs 26 near the crotch.

A crotch bag or pocket 30 is detachably secured to the garment at the crotch 25. The bag as shown in FIGS. 1, 2 and 5, has an open top and closed bottom. Bag 30 is formed of moistureproof, nonporous plastic material such as polyethylene, vinyl or the like. Snap fastener members 32 are provided at opposite sides of the bag near the open top. Members 32 engage with mating fastener members 28 respectively, to hold the bag in a depending position under the crotch. The tubular extension 27 fits inside the open top of the bag. A plurality of small holes 23 extend circumferentially around the bag near the open top for ventilation. The bag is so disposed and arranged that body parts of the wearer are enclosed within the bag.

At the bottom of the bag may be provided a removable mass or pad 33 of fibrous material made of paper, cellulose, or other absorbent material. The bag serves to prevent leakage of urine drippings and the pad 33 absorbs the liquid. The wet pad 33 can easily be removed and discarded by flushing away in a toilet.

The bag 30 is readily detached from the undergarment by disengaging the snap fastener members. The bag can be washed and deodorized with any suitable deodorant powder, spray or the like. An antispetic or germicidal powder or spray can be applied to the bag interior of sanitary, hygienic purposes.

In FIG. 6, the bag 30ᵃ is similar to bag 30 and corresponding parts are similarly numbered. Bag 30ᵃ has an outer covering or layer of cloth 31 which will resemble in appearance the cloth of the undergarment 20. The inside of the bag is lined with a moistureproof plastic lining 35. This construction may be preferred in place of the smooth, plastic appearance of bag 30.

Bag 30ᵇ shown in FIG. 7, has nonporous plastic layer 35ᵃ on the outside for moistureproofing and porous cloth lining 31ᵃ is on the inside. This bag may be somewhat more comfortable to wear than bags 30 and 30ᵃ since the cloth lining will absorb some moisture and prevent chafing.

Figure 9:
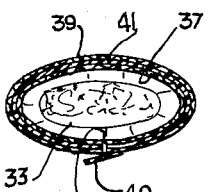
FIG. 9 is a cross-sectional view taken on line 9—9 of FIG. 8.
Figure 10:
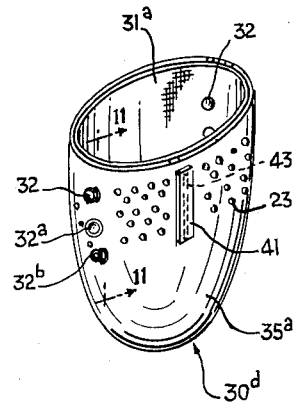
FIG. 10 is a perspective view of another crotch bag.

Bag 30ᶜ shown in FIGS. 8 and 9 has a triple layer construction wih innermost cloth lining 37 for comfort and moisture absorption, an outer cloth layer 39 which may resemble in appearance that of the cloth undergarment, and intermediate moistureproof plastic or rubber interlining 41. A short vertical slit 43 is provided at the front of the bag to provide access into the bag, and a fly flap 40 may be provided to cover the slit. Ventilation holes 23 are provided around the bag as mentioned in connection with bag 30.

In FIGS. 10–15 is shown the construction of another bag 30ᵈ in which two additional snap fasteners 32ᵃ, 32ᵇ are provided in vertical alignment with fastener members 32 on each side of the bag. The male and female fastener members alternate in position with the female fastener member 32ᵃ between male fastener members 32, 32ᵇ. The bag shown has two layers such as provided for bag 30ᵇ in which the plastic layer 35ᵃ is on the outside and the cloth lining 31ᵃ is on the inside. However, the bag could have the single layer construction of bag 30, the double layer construction of bag 30ᵃ, or the triple layer construction of bag 30ᶜ.

Figure 11:
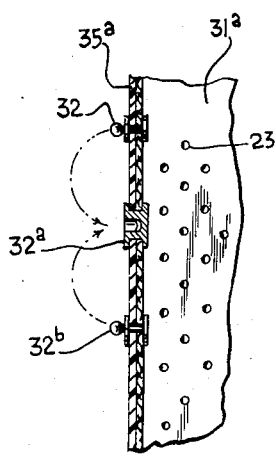
FIG. 11 is a sectional view on an enlarged scale taken on line 11—11 of FIG. 10.
Figure 12:
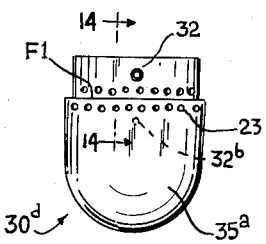
FIG. 12 and FIG. 13 are side elevational views of the bag of FIG. 10 in two different shortened conditions.
Figure 13:
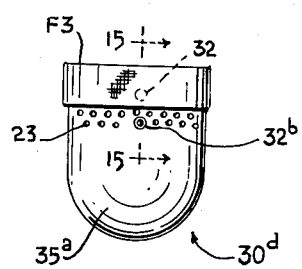
Figure 14:
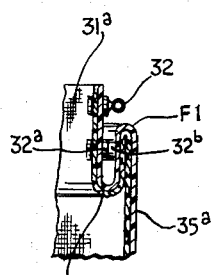
FIG. 14 is an enlarged sectional view taken on line 14—14 of FIG. 12.
Figure 15:
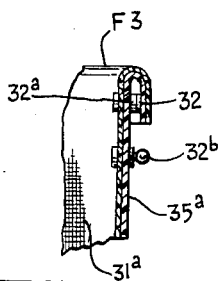
FIG. 15 is an enlarged sectional view taken on line 15—15 of FIG. 13.

The arrangement of snap fastener members is such that the bag can be axially shortened in two ways by interengaging members 32ª with either members 32 or 32ᵇ as indicated by dotted arrows A, B in FIG. 11. In FIGS. 12 and 14 the bag is shortened to a maximum extent due to engagement of members 32ª and 32ᵇ so that double folds F1, F2 are formed and extend all around the bag. Fastener members 32 are free for engagement with fastener members 28 of garment 20. In FIGS. 13 and 15 the bag is shortened to a lesser extent by folding down the top of the bag with a single fold F3. Fastener members 32, 32ª are engaged, leaving fastener members 32ᵇ free for engaging with fastener members 28 at the crotch of the garment 20.

The cloth layers of the several bags can be made of nylon or other fast drying fabric. In any case, the bags can be laundered whether attached to or detached from the undergarment 20. The invention can be applied to underwear with long legs, to legless underwear such as briefs, and the like.

The invention fulfills a long felt need in undergarments for men and boys by providing a sanitary, hygienic means for containing urine drippings, for keeping outer clothing from becoming soiled and stained, for reducing wear on the undergarments and for lengthening their useful lives.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An undergarment for a male person comprising a tubular body, integral tubular legs depending from the body, a tubular crotch portion between the legs at the bottom end of the body, snap fasteners on the legs, an elongated cylindrical pocket having an open top and closed bottom, said pocket being formed by two juxtaposed layers of porous cloth and moistureproof, nonporous sheet material respectively, and snap fasteners on opposite outer sides of the pocket engaging the snap fasteners on said undergarment, said layers having a plurality of aligned holes extending therethrough for lateral ventilation of the interior of the pocket said snap fastener members on the pocket being arranged in groups, the fastener members in each group being disposed in vertical alignment between top and bottom of the pocket with female fastener members disposed between male fastener members, whereby the pocket can be axially selectively shortened by forming circumferential folds in the pocket and engaging the female fastener members with certain of the male fastener members leaving other male fastener members for engagement with the fastener members on the undergarment legs, and a porous, moisture-absorbing pad of fibrous material removably disposed inside the pocket at the closed bottom thereof, said pocket having a vertical slit located between the top and bottom of the pocket to provide access to the interior of the pocket and a flap covering said slit.

2. An undergarment for a male person comprising a tubular body, integral tubular leg portions depending from the body and a tubular crotch portion, snap fastener elements on the leg portions outside the crotch portion, a sanitary pocket with a flexible tapering body having an open top and a closed bottom for attachment to said crotch portion, said body being formed of two juxtaposed layers of porous cloth and moistureproof, nonporous sheet material, respectively, snap fastener elements on opposite outer sides of the pocket engaging with the snap fastener elements on the leg portions, said layers having a plurality of aligned holes extending therethrough for lateral ventilation of the interior of the pocket when said pocket is attached at the crotch portion, and a porous, moisture-absorbing pad of fibrous material removably disposed inside the pocket at the closed bottom thereof, said pocket having a vertical slit through the layers located betwen the top and bottom of the pocket to provide access to the interior of the pocket and a movable flap covering said slit.

References Cited by the Examiner

UNITED STATES PATENTS

| 2,837,095 | 6/58 | Stevenson | 128—283 |
| 3,030,958 | 4/62 | Levin | 128—294 |
| 3,035,579 | 5/62 | Benovic | 128—295 |

FOREIGN PATENTS

| 697,398 | 10/40 | Germany. |
| 355,426 | 8/05 | France. |
| 641,521 | 4/28 | France. |

RICHARD A. GAUDET, *Primary Examiner.*